United States Patent
Kress et al.

(10) Patent No.: US 6,884,007 B2
(45) Date of Patent: Apr. 26, 2005

(54) TOOL FOR MATERIAL-REMOVING MACHINING OF WORKPIECES

(75) Inventors: Dieter Kress, Aalen (DE); Friederich Häberle, Lauchheim (DE)

(73) Assignee: Fabrik für Präzisionswerkzeuge, Aalen (DE)

( * ) Notice: Subject to any disclaimer, the term of this patent is extended or adjusted under 35 U.S.C. 154(b) by 0 days.

(21) Appl. No.: 10/092,768

(22) Filed: Mar. 7, 2002

(65) Prior Publication Data

US 2002/0141834 A1 Oct. 3, 2002

(30) Foreign Application Priority Data

Mar. 16, 2001 (DE) .......................... 101 13 707

(51) Int. Cl.[7] .......................... B23B 29/00; B23D 1/00
(52) U.S. Cl. .......................... 407/40; 407/47; 407/107; 407/112; 407/114; 408/188; 408/233
(58) Field of Search .......................... 407/40, 47, 49, 407/107, 108, 109, 110, 111, 112; 408/713, 213, 227, 187, 188, 229, 233, 231

(56) References Cited

U.S. PATENT DOCUMENTS

| 1,396,180 | A | * | 11/1921 | Fors .......................... 407/108 |
| 3,027,786 | A | * | 4/1962 | Severson .................... 408/197 |
| 3,354,526 | A | * | 11/1967 | Erkfritz ...................... 407/40 |
| 3,574,911 | A | * | 4/1971 | Penoyar ...................... 407/114 |
| 3,597,104 | A | * | 8/1971 | Salcumbe ................... 408/199 |
| 3,754,309 | A | * | 8/1973 | Jones et al. .................. 407/77 |
| 3,868,752 | A | * | 3/1975 | Hopkins ...................... 407/40 |
| 3,887,974 | A | * | 6/1975 | Sorice ......................... 407/113 |
| 3,896,532 | A | * | 7/1975 | Brooks ........................ 407/40 |
| 3,934,320 | A | * | 1/1976 | McCreery ................... 407/107 |
| 4,697,963 | A | * | 10/1987 | Luck ........................... 407/105 |
| 5,031,492 | A | | 7/1991 | Zinner |
| 5,079,979 | A | | 1/1992 | Pano |
| 5,100,269 | A | * | 3/1992 | Lyon et al. .................. 407/107 |
| 5,211,516 | A | * | 5/1993 | Kress et al. ................. 408/231 |
| 5,810,518 | A | * | 9/1998 | Wiman et al. ............... 407/102 |
| 5,988,952 | A | | 11/1999 | Antoun |
| 6,000,885 | A | * | 12/1999 | Erickson ...................... 407/113 |
| 6,196,774 | B1 | * | 3/2001 | Minshall ...................... 408/233 |
| 6,332,385 | B1 | * | 12/2001 | Kautto et al. ................. 82/1.11 |
| 6,379,087 | B1 | * | 4/2002 | Alexander, IV ............. 407/107 |
| 6,503,030 | B1 | * | 1/2003 | Kress et al. ................. 408/188 |

FOREIGN PATENT DOCUMENTS

| DE | 195 21 599 A1 | 12/1996 | |
| DE | 19521599 A1 | * 12/1996 | |
| DE | 198 54 873 A1 | 5/2000 | |
| FR | 76 21211 | 2/1978 | |
| JP | 55065004 | * 5/1980 | .......... B23B/27/16 |
| JP | 59224203 | * 12/1984 | .......... B23B/27/22 |
| WO | WO 91/.14528 | 10/1991 | |

* cited by examiner

*Primary Examiner*—Erica Cadugan
*Assistant Examiner*—Dana Ross
(74) *Attorney, Agent, or Firm*—Morriss O'Bryant Compagni

(57) ABSTRACT

A tool for material-removing machining of workpieces of hard metal with a blade plate held by a clamping lug is suggested which is distinguished in that the blade plate (11) has a groove (25) provided on the front side (45) in which the clamping lug (13) engages.

16 Claims, 3 Drawing Sheets

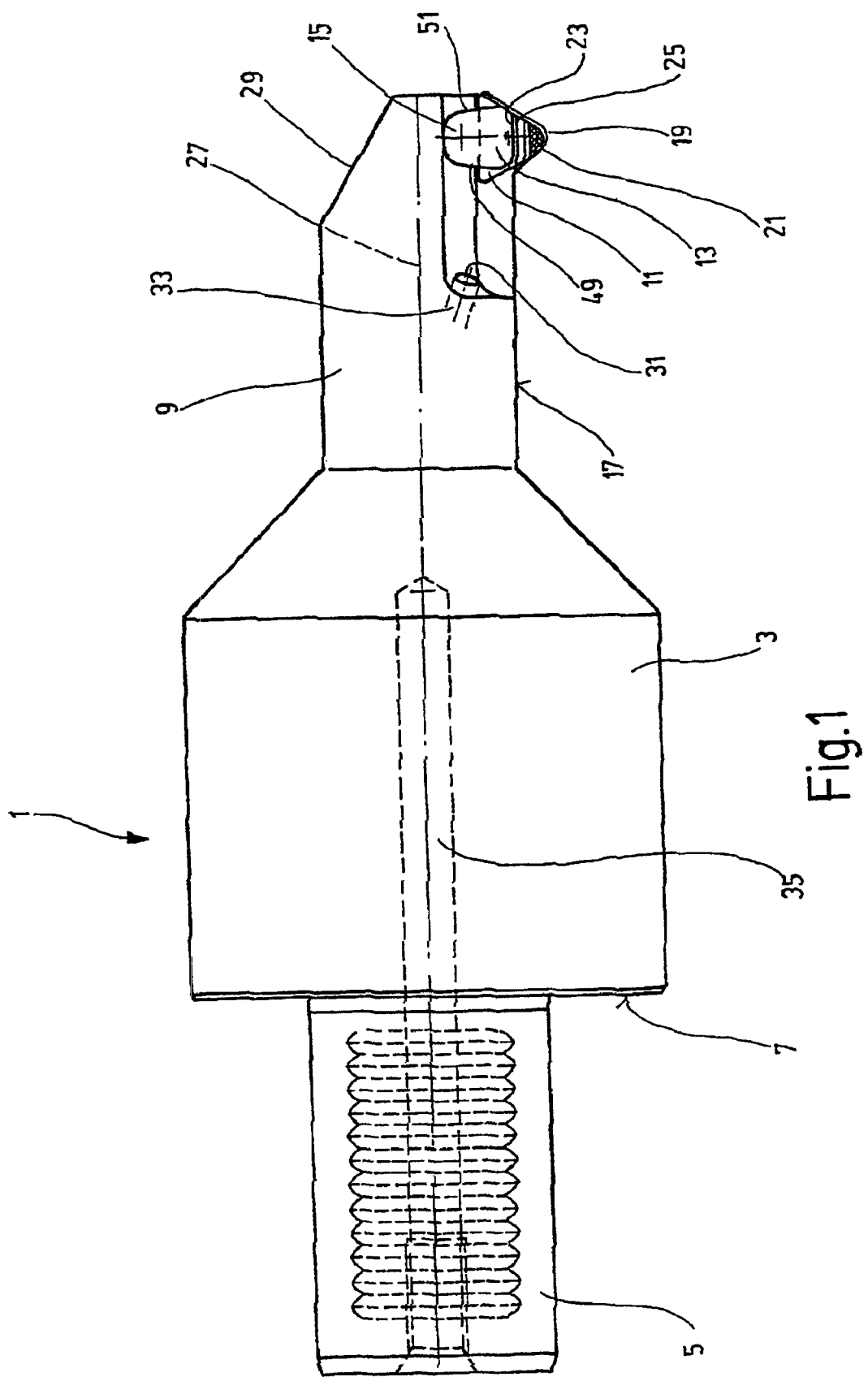

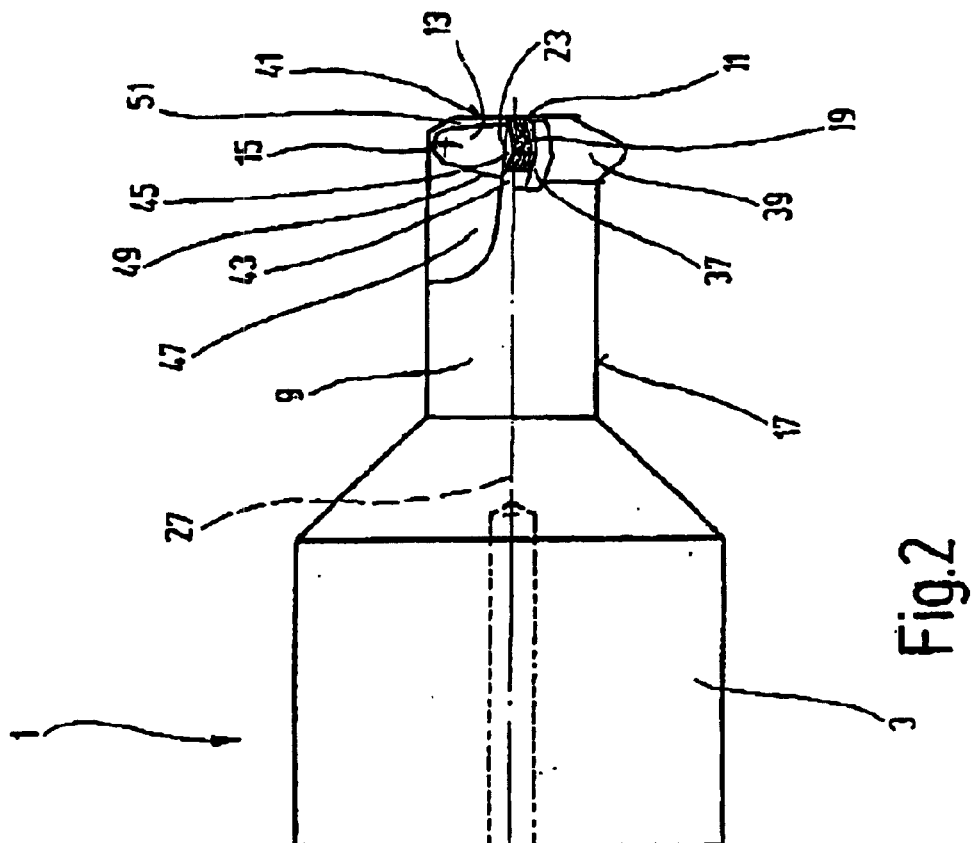
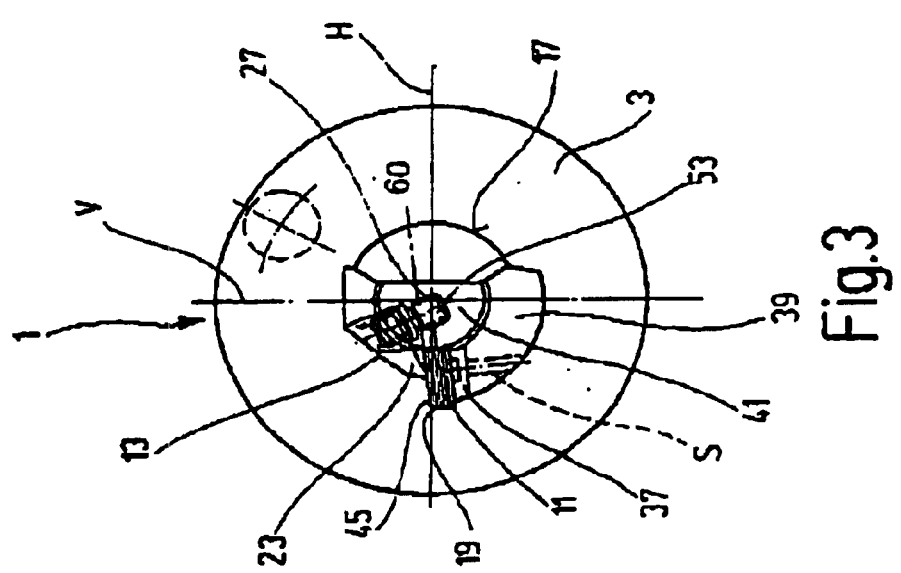

TOOL FOR MATERIAL-REMOVING MACHINING OF WORKPIECES

The invention concerns a tool for material-removing machining of high-strength workpieces according to the claims. The designation "high-strength materials" will be used below not only in reference to materials that by nature have a high degree of strength but rather also those which have a high degree of strength or hardness as a result of special treatment methods, in particular hardened workpieces such as hardened steels.

Tools of the type referred to here are known. They serve to machine workpiece surfaces, in particular drilled surfaces in workpieces to be machined which consist of high-strength materials. In order to remove the chips, the workpiece or the surface to be machined is brought past a blade plate of the tool so that the blade plate removes chips from the surface of the workpiece. In the machining of drilled surfaces, the workpiece is set in rotation and the stationary, also designated as tool is introduced into the drilled hole. It has been found that in the machining of high-strength materials, vibrations often occur which result in chatter. As a result, the machined surface of the workpieces does not have particularly good surface quality. That is, grooves and riffles can be detected which in many cases are not acceptable.

SUMMARY OF THE INVENTION

The task of the invention therefore is to create a tool of the type mentioned which does not have these drawbacks. To solve this task, a tool of the type mentioned above is proposed which has the features mentioned in the claims. It is distinguished in that the blade plate is fastened to the tool with the aid of a clamping lug which engages in a groove on the blade breast. The clamping lug presses the blade plate tightly against the tool or its base body. Because the blade plate is provided with a groove, it is ensured that it can be fixed to the tool in a specified position which makes possible vibration-free machining of the workpiece.

An exemplary embodiment of the tool is preferred which is distinguished in that its base body has a projection which serves as a support. This projection is configured so that it supports the blade plate practically over its entire back side, i.e., on the side turned away from the clamping lug. This results in the blade plate being held especially reliably to the tool and vibrations being avoided.

Especially preferred is an exemplary embodiment of the tool that is distinguished in that it is configured as one piece. This leads to a special stability of the tool and thus to a vibration-free application. In particular as a result of this, chattering can be reliably avoided during material-removing machining of workpieces. Additional embodiments are found in the other subclaims.

BRIEF DESCRIPTION OF THE DRAWINGS

The invention will be explained in greater detail below with the aid of the drawings.

FIG. 1 shows a side view of the tool;

FIG. 2 shows a top view of the tool according to FIG. 1 in reduced scale;

FIG. 3 shows a front view of the tool; and

DETAILED DESCRIPTION

Figure 4:
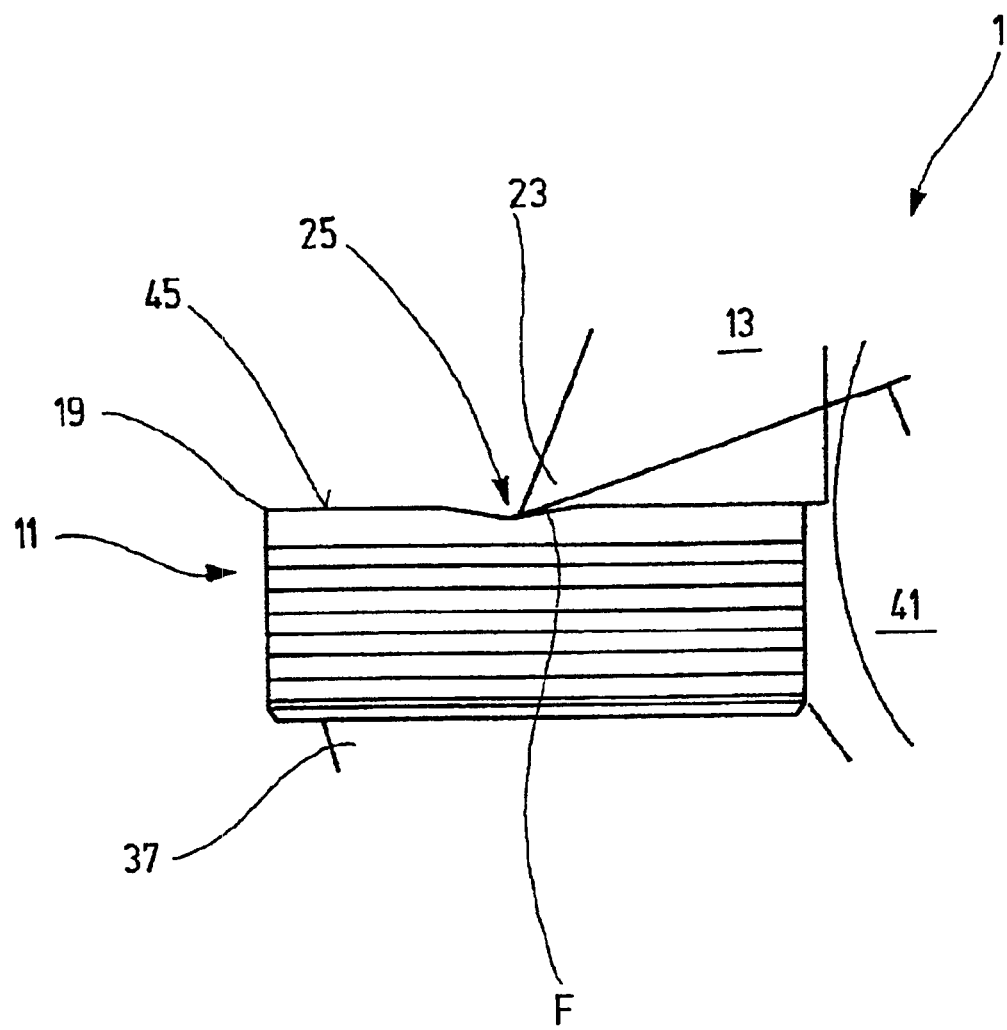
FIG. 4 shows a detail enlargement of the blade plate.

Tool 1 depicted in FIG. 1 comprises a base body 3 with a shaft 5 which serves to fasten tool 1 to a tool holding fixture or an adapter, intermediate piece or the like. Shaft 5 has a smaller diameter that the adjoining area of base body 3 so that an end face 7 is formed which preferably is ring-shaped and serves to ensure that in mounted condition, tool 1 reliably contacts the mount, intermediate piece, adapter, or the like.

On the side opposite the shaft, an area 9 of the base body is provided, the outside diameter of which is less than the portion lying between area 9 and shaft 5 of tool 1. In area 9, a blade plate 22, shown here in top view and triangular in form, is provided which, with the help of a clamping lug 13, is tightly fastened to base body 3 of tool 1. It is suggested through an x, at 15, that clamping lug 13 is fastened to base body 3 by means of a clamping screw. Around one third of blade plate 11 projects over the circumferential surface 17 of area 9 of tool 1 and in the area which projects the farthest has a cutter 19. It is suggested here by crosshatching that in the area of cutter 19, an insert 21 is provided which is distinguished through a special hardness and resistance to wear. It can be of ceramic material, diamond, or CBN.

Blade plate 11 is rounded in the area of cutter 19. Here there is a radius of curvature of 2.2 mm to 2.7 mm. A radius of curvature of approximately 2.5 mm has proven especially effective, being distinguished in that the blade plate is very stable and has little susceptibility to breakage and in particular induces little vibration when a workpiece of high-strength material is machined. In addition, as a result of the rounding in the area of cutter 19, it is ensured that in the machining of interrupted drilled surfaces, the cutter is not damaged.

The area of clamping lug 13 facing away from cross mark 15, which area is also designated clamping lip 23, rests on the front side of blade plate 11 which faces the observer and which in the contact area with clamping lip 23 is provided with a preferably continuous groove 25. Groove 25 serves to hold blade plate 11 by means of positive fit. It can be fabricated in blade plate 11 in a simple manner through a grinding process.

Groove 25—viewed from above—runs essentially parallel to the middle axis 27 of tool 1 and is arranged as close as possible to cutter 19 in order to minimize the chance of vibrations. As a result of the interplay between groove 25 and clamping lip 23 it is ensured that blade plate 11 is held secure against twisting on base body 3 of tool 1. As a result, cut properties which have once been specified are reliably retained and chattering or vibrations are avoided.

Area 9 of base body 3 is provided on the side opposite blade plate 11 with a sloping area 29 which facilitates introduction of tool 1 into a drilled hole to be machined.

In FIG. 1, an opening 31 of one of channels 33 fabricated into base body 3 is also suggested which ultimately opens, in a manner not shown in the figure, into a drilled hole 35 which here runs concentrically with the middle axis 27 in base body 3. Air is fed under pressure into this drilled hole in suitable manner which in operation of tool 1 exits out of opening 31 and carries chips out of the processing area of blade plate 11.

It is clear from the depiction according to FIG. 1 that the width of clamping lug 13 in the area of groove 25 is selected such that clamping lip 23 rests on the front side of blade plate 11 practically over its entire width. Thus an optimal position fixing of blade plate 11 to base body 3 of tool 1 and a high rigidity of clamping lug 13 are ensured. Through a corresponding configuration of clamping lip 23 it is also ensured that clamping lug 13 does not project laterally over blade plate 11. The width of clamping lip 23 is selected here such that it lies within the incircle of blade plate 11.

FIG. 2 shows tool 1 of FIG. 1 in top view so that the observer here looks down on blade plate 11. Parts that have already been explained using FIG. 1 are provided with the same reference numbers so that the preceding explanation can be referred to. It can be recognized in FIG. 2 that between base body 3 and blade plate 11, a spacer 37 can be provided which in turn in suitable manner is fastened to base body 3 of tool 1, for example by means of a screw that penetrates intermediate spacer 37 and engages into base body 3 of tool 1. The contour of spacer 37 preferably is adapted to that of blade plate 11. Therefore an essentially triangular spacer 37 is selected here, the size of which corresponds practically to that of blade plate 11 so that the entire surface of the latter up to the area of cutter 19 can rest on spacer 37. Spacer 37 is supported on its side away from blade plate 11 by a support 39 projecting across circumferential surface 17 which ensures that forces introduced into blade plate 11 through cutter 19 during machining of the workpiece are intercepted and conducted into base body 3 of tool 1.

It can be seen in the top view in accordance with FIG. 2 that blade plate 11 does not project out of circumferential surface 17 of tool 1 over its entire width. It can be seen that the side of blade plate 11 turned away from face side 41 of tool 1, base body 3 projects beyond blade plate 11 in a section 43.

The top view according to FIG. 2 also shows that front side 45 of blade plate 11 does not run parallel to middle axis 27 but rather forms an acute angle with it which opens from face side 41 in the direction toward shaft 5 and preferably is in a range from 4° to 8°, in particular approximately 6°. As a result of this acute angle, during machining of a workpiece, a flow of chips is ensured such that vibrations and oscillations are reduced to a minimum. FIG. 2 also shows that cutter 19 of blade plate 11 is on a plane 60 that intersects middle axis 27.

Above middle axis 27, in the area of blade plate 11 and adjoining to the left, a recess is provided in base body 3 of too 11 which serves as chip space 47. Chips which are removed from the workpiece run into this area. Preferably clamping lug 13 is arranged sunk in base body 3 of tool 1 such that it does not project into chip space 47 and does not negatively impair the flow of chips.

It can be seen from FIGS. 1 and 2 that clamping lug 13 is configured as a prism. It also has, extending from the clamping screw suggested by cross mark 15, two lateral surfaces 49 and 51 which run at an acute angle. These lateral surfaces serve to anchor clamping lug 13 in the tightened condition so as not to twist in base body 3 of tool 1 and thus to ensure a defined alignment of blade pate 11 which is held by means of form fit.

In the top view according to FIG. 3 on face surface 41 of tool 1, parts of the tool are broken away. As a result, clamping lug 13 can easily be recognized which rests with its clamping lip 23 on the front side 45 of blade plate 11.

In FIG. 3, a clamping screw 53 can be clearly recognized that has two threaded sections. A first threaded section engages in clamping lug 13 and a second in base body 3 of tool 1. Preferably the threaded sections are equipped with opposing threads. Clamping screw 53 runs at an acute angle to an imaginary vertical line V in order to securely fix blade plate 11 in base body 3. The blade plate 11, as can be seen in FIG. 3, is arranged such that cutter 19 touches an imaginary horizontal line H which, like vertical line V, intersects middle axis 27. The top view shows that blade plate 11 does not lie completely in a plane which coincides with horizontal line H. Instead, it is inclined at an acute angle of 4° to 8°, preferably approximately 6° such that front side 45 up to cutter 19 is arranged above horizontal line H. This arrangement also serves to ensure an optimal chip flow during machining of workpieces and to avoid chattering or oscillations.

It can be seen from FIG. 3 that support 39 is formed by a projection extending beyond circumferential surface 17 which extends as an arc above circumferential surface 17, specifically over an area of approximately 90°. Support 39 is thus especially capable of resistance and is configured such that the forces occurring during machining of a workpiece can be conducted reliably and with little oscillations into base body 3.

It is suggested with dashed lines in FIG. 3 that spacer 37 is fastened to base body 3 of tool 1 by means of a screw 9 S, specifically in the area of support 39. Forces received by spacer 37 therefore are reliably and with little oscillation conducted through support 39 into base body 3 of tool 1.

In the scaled-down depiction according to FIG. 3, groove 25 is not easily recognizable; therefore reference is made here to the detail enlargement presented in FIG. 4 which shows blade plate 11 in front view as in FIG. 3. An essential factor is that groove 25 has an edge F which inclines with respect to front side 45 of blade plate 11 and which rises in the depiction according to FIG. 4 from left to right and encloses an angle with front side 45 of approximately 6° to 12°, preferably approximately 10°. Through edge F, the forces of clamping lug 13 are distributed such that a first force component presses blade plate 11 against spacer 37 and against support 39 so that blade plate 11 is held securely in base body 3 of tool 1. A second force component acts in the direction of middle axis 27 of tool 1 so that blade plate 11 can be rotatably fixed in a specified position.

It is clear from the enlarged depiction of blade plate 11 that for practical purposes it is not weakened through groove 25. Since blade plate 11 in addition is not penetrated by a clamping screw which otherwise is usual, it is very stable, which likewise leads to low-oscillation machining of workpieces and significantly increases tool life.

Let it be expressly pointed out here that base body 3 of tool 1 is configured as one piece. Thus this means that shaft 5 transitions over the middle section of tool 1, which is distinguished by a relatively large outside diameter, into the area 9 with a smaller diameter in which blade plate 11 is mounted. As a result of the one-piece configuration of tool 1 it is ensured that during machining of a workpiece of blade plate 11 can be introduced with particular low oscillations into the holder of tool 1 so that chattering and oscillations can be avoided with high reliability during machining of the tool 1. Blade plate 11 therefore is very stable and is very low in oscillations in the machining of workpieces because it is held by means of a clamping lug and not by means of a screw penetrating through the blade plate.

Tool 1, which was explained with the aid of FIGS. 1 through 4, thus is distinguished by a special configuration which makes it possible to machine workpieces of high-strength materials with the aid of a blade plate 11 without oscillations occurring which would lead to an impairment of the workpiece surface which is to be machined and to a persistent shortening of the tool life. The interplay of various measures, specifically the one-piece configuration of tool 1, the reliable bedding of blade plate 11 through support 39, if applicable through a spacer 37, and the fact that support 39 projects over circumferential surface 17 of base body 3, finally the mounting of blade 11 to base body 3 of tool 1 so as not to twist produce outstanding machining results even, and in particular, when the workpiece is composed of high-strength materials. In order not to impair the material properties of tool 1 and of blade 11 as well as the workpieces to be machined which become very hot during machining, chips which are created are not carried away from the machining site by means of a coolant and/or lubricant but rather by means of air at overpressure which is conducted out of opening 31 onto the machining area.

What is claimed is:

1. A tool for material-removing machining of workpieces of hard metal, the tool comprising:
   a base body having a longitudinal axis of rotation;
   a blade plate of triangular shape having a front side, a cutter formed at one apex of said triangular shape opposite an inner side of said triangular shape, and a continuous, linear groove formed within said front side which extends in length from one side of said triangular shape to the adjoining side of said triangular shape in an orientation parallel to said inner side of said triangular shape and oriented parallel to said longitudinal axis of rotation of said base body to stabilize said blade plate in operation; and
   a clamping lug having a clamping lip sized for receipt in said groove of said blade-plate, said clamping lip having a selected width which corresponds to approximately the length of said linear groove and lies within an incircle of said blade plate.

2. The tool according to claim 1, wherein said groove in cross section has an edge which is oriented at an angle to the plane of said front side of said blade plate, said angle being between about 8° and 12°.

3. The tool according to claim 2, wherein said angle of said edge is approximately 10°.

4. The tool according to claim 1 wherein at least a portion of said base body is cylindrical and has a longitudinal axis extending therethrough.

5. The tool according to claim 4, wherein said base body has a radially-extending arched projection located in proximity to said blade plate which serves as a support for said blade plate.

6. The tool according to claim 4, wherein said base body is constructed as one piece.

7. The tool according to claim 4 wherein said cutter extends radially from said base body and said front side of said blade plate is oriented at an acute angle to a plane transecting said central axis.

8. The tool according to claims 7 wherein said acute angle is between 4° and 8°.

9. The tool according to claim 1 wherein said groove is located in close proximity to said cutter.

10. The tool according to claim 1, wherein said cutter is curved and has a defined radius of curvature.

11. The tool according to claim 1, wherein said clamping lug is configured with two non-parallel lateral surfaces oriented at an acute angle to each other which contact and engage said base body to prevent said clamping lug from moving relative to said base body thereby securing said blade plate in position.

12. A tool for material-removing machining of workpieces of hard metal, the tool comprising:
   a base body at least a portion of which is cylindrical and having a longitudinal axis of rotation formed therethrough;
   a blade plate secured to said base body and held by a clamping lug, said blade plate having a radially extending clamping lug and a front side with a continuous linear groove of selected length formed in said front side oriented parallel to said longitudinal axis of rotation and sized for receiving a clamping lip of said clamping lug within said linear groove along substantially the length of said linear groove to stabilize said blade plate in operation; and
   an arcuate projection extending radially relative to said longitudinal axis of said cylindrical base body and located in proximity to said blade plate for support thereof.

13. The tool according to claim 12 further comprising a spacer positioned between said arcuate projection and said blade plate, said spacer being adapted to the contour of said blade plate and being sized in dimension to extend radially a distance less than said cutter.

14. The tool according to claim 12, wherein said arcuate projection extends circumferentially from a point near said blade plate to a distance of about 90° about said longitudinal axis of said base body.

15. A tool for material-removing machining of workpieces of hard metal, the tool comprising:
   a blade plate held by a clamping lip, said blade plate being triangular in shape with a first edge defining a directional axis of rotation and a curved cutter formed at an apex of said triangular shape opposite said first edge, said blade plate having a front side with a continuous, linear groove formed in said front side in which said clamping lip engages, said linear groove extending in length from one side of said triangular shape adjacent to said cutter to the other side of said triangular shape adjacent said cutter, and said clamping lip having a width which corresponds to approximately the length of said groove and lies within an incircle of said blade plate, the linear groove being positioned in close proximity to said curved cutter and oriented parallel to said directional axis of rotation; and
   a clamping lug configured with two non-parallel lateral surfaces oriented at an acute angle to each other positioned for contact and engagement with a tool body to prevent said clamping lug from moving relative to a tool body thereby securing said blade plate in position.

16. The tool according to claim 15, wherein the groove has an edge which is disposed at an angle of between about 8° and 12° with respect to a plane formed along the front side of the blade plate.

* * * * *